United States Patent
Gnauert

(10) Patent No.: US 11,114,971 B2
(45) Date of Patent: Sep. 7, 2021

(54) METHOD FOR CONTROLLING A DRIVE MOTOR OF AN ACTUATOR AS WELL AS DRIVE MOTOR OF AN ACTUATOR

(71) Applicant: SBS-Feintechnik GmbH & Co. KG, Schonach (DE)

(72) Inventor: Uwe Gnauert, Villingen-Schwenningen (DE)

(73) Assignee: SBS-Feintechnik GmbH & Co. KG, Schonach (DE)

(*) Notice: Subject to any disclaimer, the term of this patent is extended or adjusted under 35 U.S.C. 154(b) by 2 days.

(21) Appl. No.: 16/695,394

(22) Filed: Nov. 26, 2019

(65) Prior Publication Data
US 2020/0169211 A1    May 28, 2020

(30) Foreign Application Priority Data
Nov. 27, 2018 (DE) .................... 10 2018 009 408.2

(51) Int. Cl.
| | |
|---|---|
| H02P 27/08 | (2006.01) |
| F16K 31/04 | (2006.01) |
| H02K 7/00 | (2006.01) |
| H02K 7/116 | (2006.01) |

(52) U.S. Cl.
CPC .......... H02P 27/085 (2013.01); F16K 31/046 (2013.01); H02K 7/003 (2013.01); H02K 7/116 (2013.01)

(58) Field of Classification Search
CPC .... H02P 1/30; H02P 6/183; H02P 9/42; H02P 23/28; H02P 27/085; H02P 2203/11; F16K 31/046; H02K 7/116
See application file for complete search history.

(56) References Cited

U.S. PATENT DOCUMENTS

| | | | | |
|---|---|---|---|---|
| 2016/0352241 | A1* | 12/2016 | Takahashi | H02M 1/12 |
| 2018/0154786 | A1* | 6/2018 | Wang | H02P 6/28 |
| 2018/0187790 | A1* | 7/2018 | Schmidt | F16K 31/046 |
| 2019/0253014 | A1* | 8/2019 | Iwaji | H02P 27/08 |
| 2019/0366854 | A1* | 12/2019 | Sun | B60L 15/02 |
| 2020/0114949 | A1* | 4/2020 | Eickholt | H02P 6/10 |

FOREIGN PATENT DOCUMENTS

| | | |
|---|---|---|
| DE | 10 2008 040 920 | 2/2010 |
| DE | 10 2010 025 207 | 12/2011 |
| DE | 10 2017 128 260 | 6/2018 |
| DE | 10 2017 002 743 | 9/2018 |

OTHER PUBLICATIONS

Carlosena, A. et al: Randomized Carrier PWM With Exponential Frequency Mapping; IEEE Transactions on Power Electronics; vol. 22, No. 3; May 2007.

* cited by examiner

*Primary Examiner* — Said Bouziane
(74) *Attorney, Agent, or Firm* — Gudrun E. Huckett

(57) ABSTRACT

In a method for controlling a drive motor of an actuator for actuating a valve, the power of the drive motor is supplied by pulse width modulated voltage controlled by a control frequency to adjust the actuator coupled to a valve into a desired position. The control frequency is changed such that a mixture of frequencies is produced. The control frequency is changed in steps. The frequencies of the mixture of frequencies are selected to be near the nominal control frequency. A drive motor of an actuator is provided that is controlled by the described method.

21 Claims, 4 Drawing Sheets

METHOD FOR CONTROLLING A DRIVE MOTOR OF AN ACTUATOR AS WELL AS DRIVE MOTOR OF AN ACTUATOR

BACKGROUND OF THE INVENTION

The invention relates to a method for controlling a drive motor of an actuator for actuating a valve, in particular for control of volume flows in an internal combustion engine, in which the power of the drive motor is supplied by means of pulse width modulated voltage with a control frequency in order to position the actuator with valve coupled thereto in the desired position. The invention also relates to a drive motor of an actuator for a valve shaft that is controlled by a method as described above.

Such electromotorically driven actuators are used for actuating valves, for example, flaps, ball valves and the like which perform the control of volume flows. Such volume flows are, for example, exhaust gases, raw air in the engine intake, intake air throttling, liquids or gases in cooling/heating circuits. The output shafts of the actuators transmit the positioning movement to the respective valve.

The shaft is controlled or regulated to rotate such that the valve is moved into the desired position. In case of actuators without control unit and power amplifier of the motor, this task is performed directly by a superordinate control device; in systems with control unit and power amplifier of the motor, this task is performed by the actuator itself, wherein the nominal angle position, in turn, is predetermined by the superordinate (motor) control device. In general, the angle position is reported to the superior control device in both variants. The signal exchange of the angle position can be realized by means of a pulse width modulated signal (PWM signal). The PWM signal of the superordinate control device provides the information in regard to the desired position of the valve. The actuator also supplies by means of a pulse width modulated signal the information of the actual angle position to the control device. The information is provided by means of the magnitude of the duty cycle of the pulse width modulation (PWM). In pulse width modulation, the duty cycle of the rectangular pulse is modulated, i.e., the width of the pulses forming it, at constant frequency. By means of the time ratio between on-time and off-time, the angle information is transmitted to the shaft. The duty cycle percentage is the quantity representing the angle by which the shaft must be rotated so that the valve is moved into the desired position. In case of an exhaust flap, for example, the angle adjustment range of the exhaust flap is correlated with a duty cycle of 10% to 90%. When the actuator comprises a microcontroller and power amplifier, the shaft is rotated to the desired position. The angle position is detected by the angle sensor at the shaft and reported to the control unit.

The PWM voltage cannot only be used for information transmission but also for power transmission. By means of the PWM voltage, the drive motor is controlled on the basis of a switching frequency in a certain frequency range. The variable duty cycle represents in this context the power that is to be supplied to the drive motor. In general, the control of the drive motor is realized by means of a bridge circuit. The thermal load of the bridge circuit increases with increasing frequency of the PWM voltage due to switching losses.

Since the drive motor in general is a direct current motor with a coil system, the pulse width modulated (PWM) control of the drive motor leads to a current modulation and thus to a magnetic flux change. The latter, in turn, effects by magnetostriction length changes in the lamination stacks of rotor and/or stator of the electric motor. This type of control with constant frequency leads to the drive motor developing a clearly audible noise which is perceived by the human ear as very unpleasant.

In principle, the frequency could be moved into the range of very low frequencies or into the range of very high frequencies; however, this entails significant disadvantages. Low frequencies in the range of less than approximately 200 Hz would be more advantageous with respect to noise development but they are not suitable for the drive motors of these actuators.

Since the human ear in general cannot hear very high frequencies, for example, frequencies higher than approximately 18 kHz, such high frequencies would be advantageous for avoiding the noise development. However, such high frequencies lead to further disadvantages. The control of the motor by the bridge circuit with these frequencies has been found to be disadvantageous with regard to observing legal requirements with respect to electromagnetic compatibility (EMC). This control is therefore not suitable for fulfilling today's EMC specifications. Moreover, with increasing switching frequency the thermal load of the bridge circuit increases significantly which disadvantageously affects the thermal management of the actuator and limits its function, e.g. in case of the high temperatures at an exhaust system.

The invention has therefore the object to configure the method of the aforementioned kind and the drive motor in such a way that the control frequency of the PWM signal is within the audible low frequency range but the perception of the disturbing noise is less disturbing.

SUMMARY OF THE INVENTION

This object is solved for the method of the aforementioned kind in accordance with the invention in that the control frequency of the PWM control is changed such that a frequency mixture is produced.

This object is further solved in regard to the drive motor in accordance with the invention in that the drive motor is configured to be controlled by the method according to the invention.

In conventional pulse width modulation, the control is realized at a fixed nominal frequency. In deviation therefrom, the pulse width modulation of the motor control in the method according to the invention uses no constant frequency but the frequency of the PWM control is changed multiple times such that a frequency mixture is produced. This frequency mixture comprised of different frequencies leads to the effect that the noise development of the actuator is not perceived as unpleasant by the human ear. Due to the frequency mixture, the control frequency can be maintained in the low frequency range. In this frequency range, the requirements in regard to EMC and the thermal management can be fulfilled.

The control frequencies are advantageously changed in steps which can be easily realized technically.

The different control frequencies within the frequency mixture are close to the nominal frequency that is provided for PWM control.

In an advantageous embodiment, the frequency mixture extends across a few frequency groups. In this context, use is made of the physiological perception of loudness when listening to a frequency group. The human ear divides the audible frequencies into 24 frequency groups. Therefore, a frequency mixture that extends across a few of such frequency groups provides for a pleasant acoustic perception of the control of the drive motor.

The frequency mixture can be embodied in an advantageous manner as pink noise when the control frequencies within one or a plurality of frequency groups are mixed with the same incidence.

In principle, it is however also possible to mix the control frequencies within a frequency group with different incidence.

Advantageously, a fixed frequency sequence is repeated.

In a preferred embodiment, the frequencies of the frequency sequence are applied for an integer number of periods, wherein the number of periods is in the range of 1 to 0.2×control frequency.

When the frequency is varied with an irregular number of periods, an advantageously pleasant noise results in operation of the drive motor.

Beneficial conditions result when the number of the frequencies of the frequency sequence is in the range of 2 to 1,000, in particular in a range of 2 to 50.

It is particularly advantageous when for producing the frequency mixture only a few frequencies are utilized because in this way the technical realization is significantly simplified.

A particularly advantageous embodiment results in this context when three different frequencies in two frequency groups are mixed.

In the method according to the invention, the temporal sequence between the control frequencies is realized in irregular time intervals and with irregular change of the height of the frequency. In this way, a particularly advantageous acoustic hearing impression is provided.

An advantageous technical realization results when a fixed frequency sequence is repeated periodically. In this context, the frequency sequence is to be selected to be sufficiently long. As an example, 35 frequency jumps within a frequency sequence with 63 periods are advantageous.

The control frequency lies advantageously in a frequency range higher than approximately 200 Hz and/or advantageously in a frequency range lower than approximately 5 kHz.

A particularly preferred range of the control frequencies lies in a frequency range between approximately 1 kHz and approximately 5 kHz.

Advantageously, the drive motor of the actuator is controlled by a bridge circuit, preferably an H-bridge.

The drive motor is advantageously connected by a gear to the shaft and drives the shaft.

The drive motor according to the invention of the actuator for the shaft is controlled according to the invention with a control method as disclosed. The drive motor operates at low noise, in particular without a running noise that is unpleasant to the human ear. Since the drive motor is controlled in the low frequency range, the legal requirements in regard to EMC can be fulfilled. Also, the thermal load, in particular of the bridge circuit, is kept very low.

The subject matter of the application results not only from the subject matter of the individual claims but also from all specifications and features disclosed in the drawings and the description. They are claimed as being important to the invention even if they are not subject matter of the claims as far as, individually or in combination, they are novel relative to the prior art.

Further features of the invention result from the additional claims, the description, and the drawings.

BRIEF DESCRIPTION OF THE DRAWING

The invention will be explained in more detail with the aid of two embodiments illustrated in the drawings.

DESCRIPTION OF THE PREFERRED EMBODIMENTS

Figure 2:
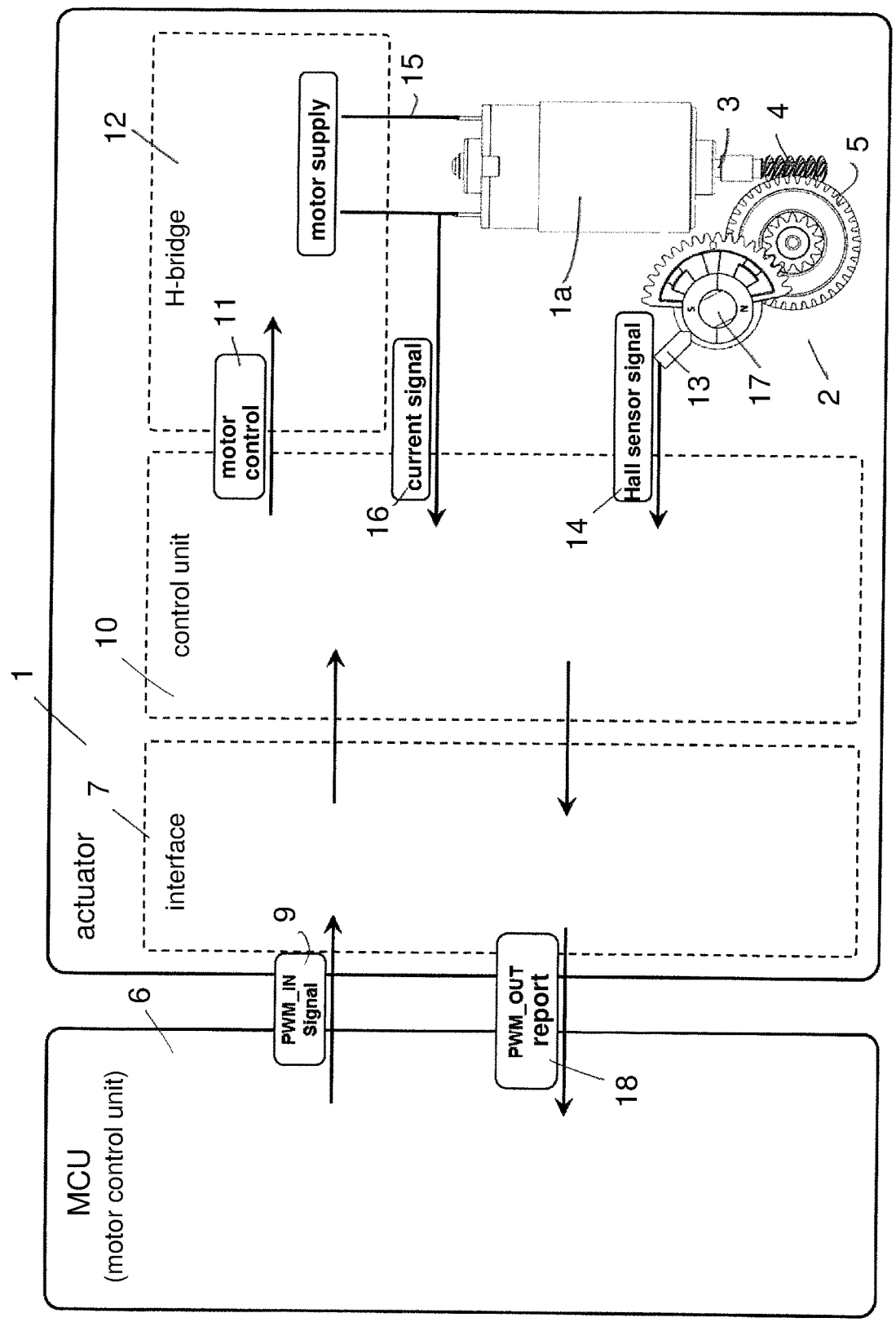
FIG. 2 shows in schematic illustration a block diagram of a control of an actuator with a microcontroller, power stage (H-bridge circuit), drive motor, and sensor system.

FIG. 2 shows an actuator 1 with a drive motor 1a in the form of an electric motor which, by means of a gear 2, adjusts a shaft 17 that can be a flap (not illustrated), which may be an exhaust flap or a throttle flap in a motor vehicle, or a valve of a cooling/heating circuit. Depending on the position of the shaft 17, the flow cross section for the exhaust gas, the air/fuel mixture or the gas or the liquid of the cooling/heating circuit is changed. The drive motor 1a has a motor shaft 3 that drives in rotation the shaft 17 supporting the flap by means of a worm gear with a worm 4 and a worm wheel 5 and at least one further gear stage.

In the embodiment, the gear is a worm gear. The gear can also be any other suitable gear, for example, a planetary gear or a spur gear as it is used in case of spur gear actuators.

A motor control unit 6 is connected to the actuator 1 which supplies the control signal 9 for the actuator. The control signal 9 is an angle signal with which the angle position of the shaft 17 is determined. The control signal 9 is supplied as a PWM input signal to control unit 10 of the actuator by means of interface 7. The control unit 10 generates, based on the PWM input signal 9, a PWM motor control signal 11 that is supplied to the drive motor 1a by a bridge circuit 12, preferably an H-bridge, for control of the drive motor 1a. In accordance with the pulse width modulated motor control signal 11, the motor shaft 3 is rotated such that the shaft 17 is moved into the required position by means of the gear 2.

A Hall sensor 13 is arranged at one of the gear wheels for detecting the actual position of the shaft 17. The Hall sensor 13 sends a sensor signal 14 to the microcomputer 10 which compares the sensor signal 14 (actual signal) with the PWM input signal 9 (nominal signal). By this control action, the actuator 1 is actuated such that the shaft 17 reaches its required nominal position.

In the described way, by means of the PWM voltage (PWM motor control signal 11), power is transmitted via line 15 to the drive motor 1a.

The control unit 10 receives a current sensor signal 16 from the drive motor 1a; this current sensor signal 16 is evaluated by the control unit 10 in a suitable way.

The control unit 10 supplies a pulse width modulated return signal 18 to the motor control unit 6 that can evaluate this PWM return signal in a suitable way.

The switching frequency of the PWM motor control signal 11 is in a frequency range of 200 Hz to 25 kHz. Advantageously, this frequency range is approximately 1 kHz to 5 kHz. By means of this pulse frequency, the drive motor 1a is controlled by the bridge circuit 12. The drive motor 1a is a direct current motor. The power that is supplied to the drive motor 1a is determined by the changed duty cycle (0% to 100%). This type of power regulation is generally known and therefore only described briefly. With increasing frequency, the thermal load of the bridge circuit 12 increases due to switching losses.

The PWM control of the drive motor 1a leads to a current modulation and thus to a magnetic flux change. The magnetic flux change leads as a result of magnetostriction to length changes, in particular of the laminations within the lamination stack of the rotor of the drive motor 1a. Due to this control action, the actuator 1 radiates the frequency associated with this control action in the form of acoustic noise.

In order for this acoustic noise to not be perceived by the user as disturbing, the method as described in the following is employed. The method makes it possible to leave the control frequency in the audible low frequency range and to configure the disturbance suppression and the thermal load of the circuit in a beneficial way.

In a conventional pulse width modulation at a constant nominal frequency 1/T (FIG. 1), the duty cycle t1/T of a rectangular pulse is modulated, i.e., the width of the pulse forming it. In the pulse width modulation, the voltage changes between two values which, for example, correspond to 12 volt and 0 volt. The nominal frequency 1/T remains constant.

Figure 4:
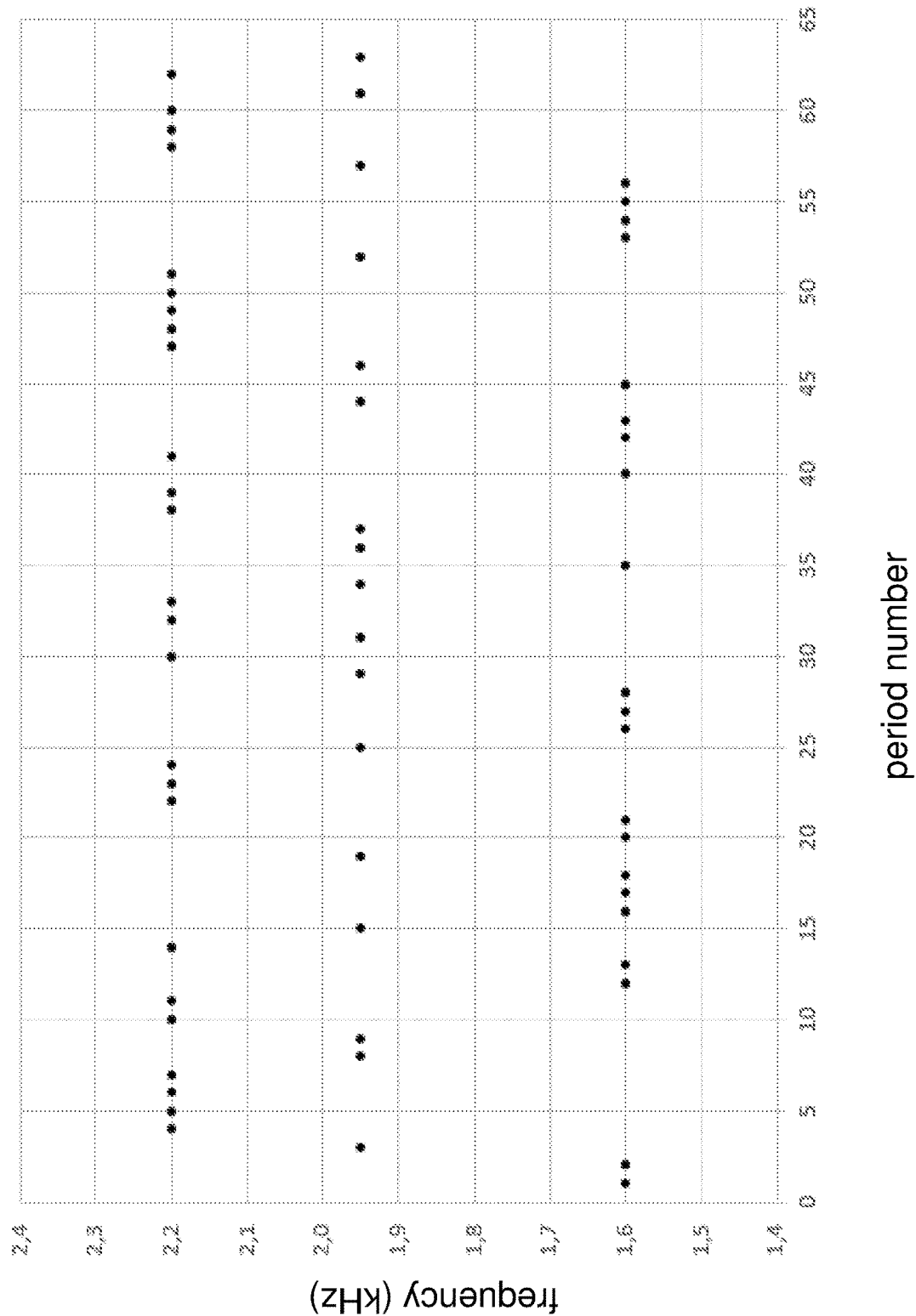
FIG. 4 shows in a diagram the temporal sequence of the varying frequencies with integer number of wavelengths when performing the method according to the invention.

In contrast to this, in the new method the nominal frequency 1/T changes, wherein t1 is adjusted such that the duty cycle remains the same. An example for this is shown in FIG. 4. As can be seen in this diagram, the conventional constant frequency is replaced by a frequency which is variable in steps. In addition to the nominal frequency, further frequencies are employed whose magnitude is relatively close to the nominal frequency. The result thereof is that, in sum, a noise is produced which, in comparison to a pulse width modulation with constant frequency, is pleasant to the human ear.

FIG. 4 shows an exemplary embodiment. Switching between three frequencies 1.6 kHz, 1.9 kHz, and 2.2 kHz is carried out wherein the respective frequency is maintained across an integer number of periods. The control begins with 1.6 kHz across two full periods; subsequently, a switch to 1.95 kHz is carried out for one period; subsequently, a switch to 2.2 kHz for four periods is performed; then to 1.95 kHz for two periods, etc. The pattern is periodically repeated after the 63 periods of this frequency sequence.

As can be seen in FIG. 4, the control frequency is varied in this way across an integer number of one to five periods wherein the duty cycle, i.e., the ratio of on-time and off-time, remains constant for an assumed constant power. In sum, a frequency mixture is produced.

The frequency mixture can be, for example, also embodied as pink noise. In this context, all integer frequencies, for example, of one or a plurality of frequency groups are mixed with the same incidence. Of course, a mixture of different incidence is possible also.

The physiological perception of the loudness when hearing is realized in frequency groups. The human ear divides the audible frequencies into approximately 24 frequency groups. For a pleasant acoustic perception of the control of the drive motor 1a, a frequency mixture across one to three frequency groups is advantageous, in particular across two to three frequency groups. Since no longer a constant frequency (nominal frequency) is used for the control of the drive motor 1a, the generally known penetrating peeping noise of the actuator 1 is modified such that the user no longer perceives it as disturbing or unpleasant.

Particularly advantageous is when the frequency mixture is limited to a few frequencies. This enables a very simple realization of the motor control. It is advantageous when three frequencies in two to three frequency groups are employed. The temporal sequence between the different frequencies is realized in this context in irregular time intervals and with an irregular change between the different frequencies. This is illustrated in an exemplary fashion in FIG. 4. One can see not only the irregular time intervals but also the irregular change between the frequencies. In this way, an advantageous acoustic hearing impression is provided when operating the actuator 1.

In an advantageous embodiment, such an irregular but fixed frequency sequence is repeated periodically. In order for the noise perception to be pleasant, the period of the frequency sequence is selected to be sufficiently long. In this context, it has been found to be advantageous when 35 frequency jumps are realized within a frequency sequence of 63 periods. This is shown in FIG. 4 in an exemplary fashion.

Figure 3:
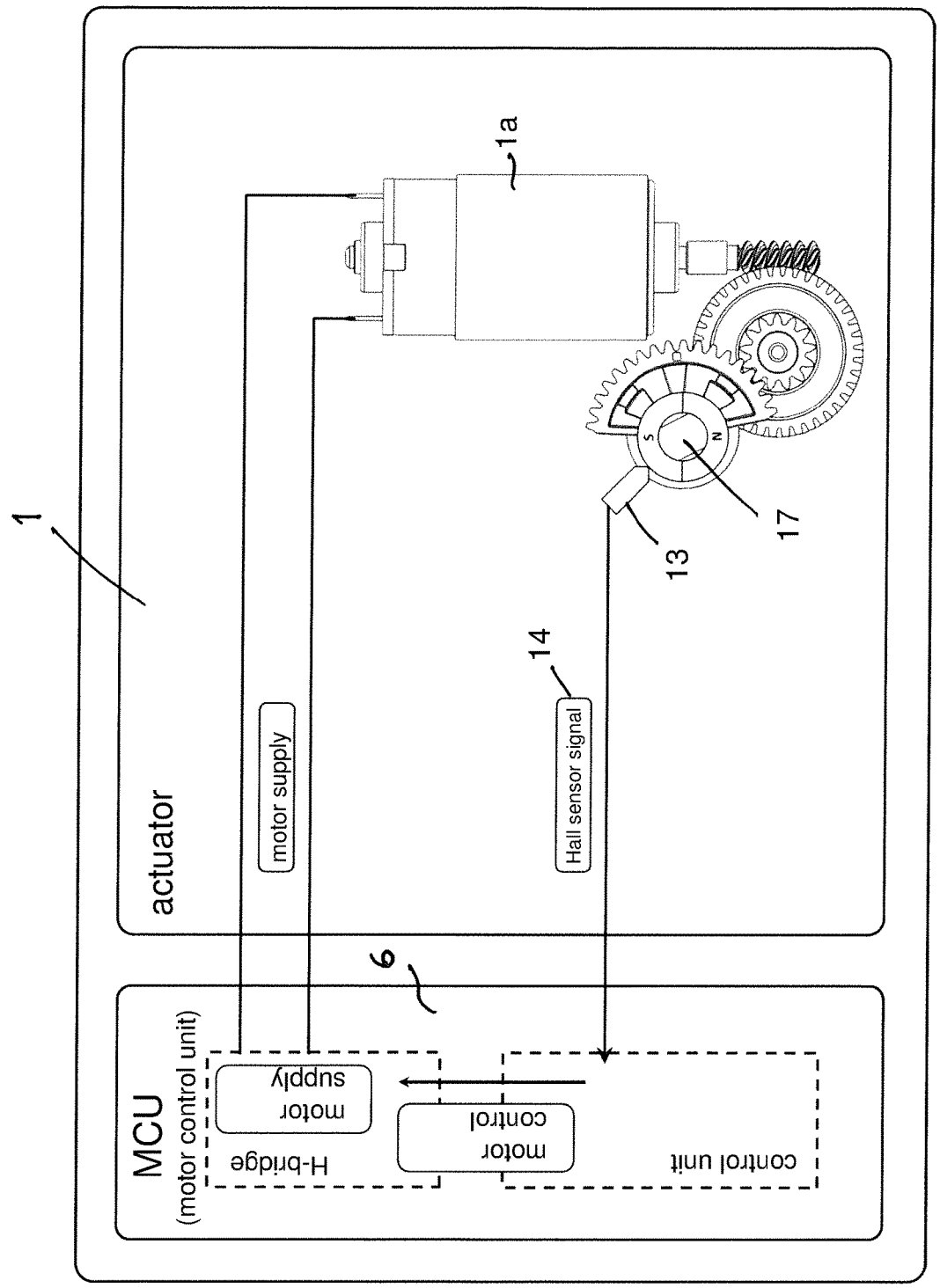
FIG. 3 shows a schematic illustration of a block diagram of an actuator without microcontroller.

FIG. 3 shows in a simplified illustration an actuator 1 that, in contrast to the embodiment according to FIG. 2, has no control unit and no power amplifier of the motor. The shaft 17 is controlled in this case directly by a control action of the motor control unit 6. The nominal angle positioning of the shaft 17 is performed by the motor control unit 6. In accordance with the embodiment of FIG. 2, the angle position of the shaft 17 is reported in the form of a sensor signal 18 to the motor control unit 6, and this signal is evaluated by the motor control unit 6.

Figure 1:
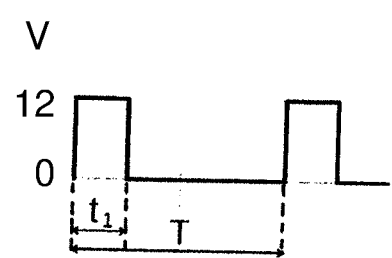
FIG. 1 shows in schematic illustration a pulse width modulation (PWM).

In other respects, the embodiment according to FIG. 3 operates in the same way as has been explained in connection with FIGS. 1, 2, and 4.

The specification incorporates by reference the entire disclosure of German priority document 10 2018 009 408.2 having a filing date of Nov. 27, 2018.

While specific embodiments of the invention have been shown and described in detail to illustrate the inventive principles, it will be understood that the invention may be embodied otherwise without departing from such principles.

What is claimed is:

1. A method for controlling a drive motor of an actuator for actuating a valve, the method comprising:
   supplying a power to the drive motor by pulse width modulated voltage controlled by a control frequency to adjust the actuator coupled to a valve into a desired position;
   changing the control frequency such that a mixture of frequencies is produced;
   repeating a fixed frequency sequence of the mixture of frequencies;
   providing frequencies of the fixed frequency sequence for an integer number of periods, wherein the integer number of periods is in a range of 1 to 0.2×control frequency.

2. The method according to claim 1, further comprising changing the control frequency in steps.

3. The method according to claim 1, further comprising selecting frequencies of the mixture of frequencies to be near a nominal control frequency.

4. The method according to claim 1, further comprising selecting frequencies of the mixture of frequencies to extend across a plurality of frequency groups.

5. The method according to claim 4, further comprising mixing the frequencies of the mixture of frequencies within one of the frequency groups with a same incidence.

6. The method according to claim 4, further comprising mixing the frequencies of the mixture of frequencies within one of the frequency groups with different incidences.

7. The method according to claim 1, further comprising varying the frequencies with an irregular number of periods.

8. The method according to claim 1, further comprising selecting the control frequency to be in a frequency range higher than approximately 200 Hz.

9. The method according to claim 1, further comprising selecting the control frequency to be within a frequency range lower than approximately 5 kHz.

10. The method according to claim 1, further comprising controlling the drive motor of the actuator by a bridge circuit.

11. The method according to claim 10, wherein the bridge circuit is an H-bridge.

12. The method according to claim 1, further comprising driving a valve shaft of the valve by the drive motor via a gear.

13. A drive motor of an actuator for a valve shaft, the drive motor configured to be controlled by a method according to claim 1.

14. A method for controlling a drive motor of an actuator for actuating a valve, the method comprising:
supplying a power to the drive motor by pulse width modulated voltage controlled by a control frequency to adjust the actuator coupled to a valve into a desired position;
changing the control frequency such that a mixture of frequencies is produced;
repeating a fixed frequency sequence of the mixture of frequencies;
wherein a number of frequencies of the fixed frequency sequence is in a range of 2 to 1,000.

15. The method according to claim 14, wherein the range is 2 to 50.

16. The method according to claim 14, further comprising changing the control frequency in steps.

17. The method according to claim 14, further comprising selecting frequencies of the mixture of frequencies to be near a nominal control frequency.

18. The method according to claim 14, further comprising selecting frequencies of the mixture of frequencies to extend across a plurality of frequency groups.

19. The method according to claim 18, further comprising mixing the frequencies of the mixture of frequencies within one of the frequency groups with a same incidence.

20. The method according to claim 18, further comprising mixing the frequencies of the mixture of frequencies within one of the frequency groups with different incidences.

21. A drive motor of an actuator for a valve shaft, the drive motor configured to be controlled by a method according to claim 14.

* * * * *